April 14, 1964 F. LAA ETAL 3,128,850
BRAKE MECHANISM FOR PUSH BUTTON CONTROLLED
TAPE RECORDERS AND RECORD PLAYERS
Filed July 8, 1959 3 Sheets-Sheet 1

INVENTOR
FRIEDRICH LAA
KARL GOTTFRIED
BY
[signature]
AGENT

April 14, 1964 F. LAA ETAL 3,128,850

BRAKE MECHANISM FOR PUSH BUTTON CONTROLLED TAPE RECORDERS AND RECORD PLAYERS

Filed July 8, 1959 3 Sheets-Sheet 2

INVENTOR
FRIEDRICH LAA
KARL GOTTFRIED
BY
Frank R. Jufani
AGENT

INVENTOR
FRIEDRICH LAA
KARL GOTTFRIED
BY
Frank R. Jeffries
AGENT

United States Patent Office 3,128,850

Patented Apr. 14, 1964

3,128,850

BRAKE MECHANISM FOR PUSH BUTTON CONTROLLED TAPE RECORDERS AND RECORD PLAYERS

Friedrich Laa, Vienna, and Godfried Kargl, Brunn am Gebirge, Austria, assignors to North American Philips Company, Inc., New York, N.Y., a corporation of Delaware Filed July 8, 1959, Ser. No. 825,718
Claims priority, application Austria July 9, 1958
4 Claims. (Cl. 188—106)

This invention pertains to tape recorders and record players in which manual control of the several motions of the tape reel or spool, or turntable, is initiated by push button type switches, and more particularly to a single brake and brake operating linkage or mechanism, that is operated by a plurality of push buttons, one each for the separate motions required, which may be spatially located to a greater or lesser degree.

It is noted that positive braking action is required in tape recorders and record players, even though the driving mechanism is disengaged, to prevent drift of the spools or turntable.

Heretofore, a single pivoted lever type control has been widely utilized to start and stop a spool or turntable and to initiate clockwise or counterclockwise rotation of a tape recorder spool. Such a switch can be easily constructed to start and stop movement of a spool or turntable since the brakes and a single associated linkage means can be easily controlled from a single location.

A single location or point of control is lost when a push button is used to control a single movement, where several movements, and thus several push buttons, are necessary. As a result it has been necessary heretofore to provide several separate brake controlling mechanisms associated with each push button or groups of neighboring push buttons. Obviously, while such duplication is costly per se, it also creates complications due to the minimal space allowances for such mechanisms, and results in excessive assembly and repair costs.

The above enumerated disadvantages of known push button controls for tape recorders and record players are overcome according to this invention by providing a single brake actuating linkage or mechanism to apply and release a brake, or in the case of tape recorders to apply and release a pair of brakes, one for each spool. The brake actuating linkage is controlled from a single lever or pawl element, or an equivalent like element, to which each of the push buttons is connected. Thus, the brakes are applied and/or released by each of the push buttons.

In one form of the invention a cantilevered member is utilized, in which the ends of the cantilever are connected to spatially located lever type push buttons hereinafter referred to as a key, or groups of such keys and a single brake linkage is connected intermediate the ends of the cantilever. When a key at one end of the cantilever is depressed the cantilever pivots about its other end to actuate the brake linkage, which releases the brakes previously applied. When this same key is returned to an inoperative position the brake linkage, constrained by a spring, or equivalent arrangement, returns to its initial position. In another form of the invention a rotatable torque bar arrangement, hereinafter referred to as a pawl is utilized in place of the cantilever or rocking lever described above. One end of the elongated pawl is connected to a brake linkage, or in a tape recorder where two brakes are utilized, one for each spool, a brake linkage is connected at each end of the pawl. Intermediate the ends of the pawl a plurality of separate push buttons are each connected to the pawl. In this arrangement a compact switch board (keys or push buttons) is provided in which each switch is independently operable on a single brake and brake actuating linkage.

In each of the forms of the invention briefly described above each switch, whether key or button type, is maintained depressed in any known suitable manner and may be released by depressing a separate switch operating as an overcontrolling release switch. Also, the switches are temporarily movable, in a manner known per se, beyond their on-position whereby the brakes are applied to arrest the turntable or tape spools.

The invention will be described in connection with tape or wire recorders for the sake of clarity and conciseness; the teachings of the invention being readily adapted to record players by those skilled in the art.

The above described objects and advantages, and additional advantages and objects will be described in connection with the appended drawings illustrating presently preferred embodiments of the invention in which.

For the sake of clearness only those constructional parts are shown which are relevant to the invention or require a particular design in connection therewith.

Figure 2:
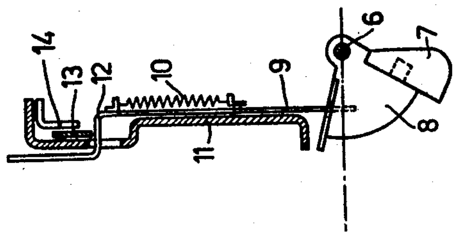
FIGURE 2 is a cross-sectional view of a detail of FIGURE 1.
Figure 1:
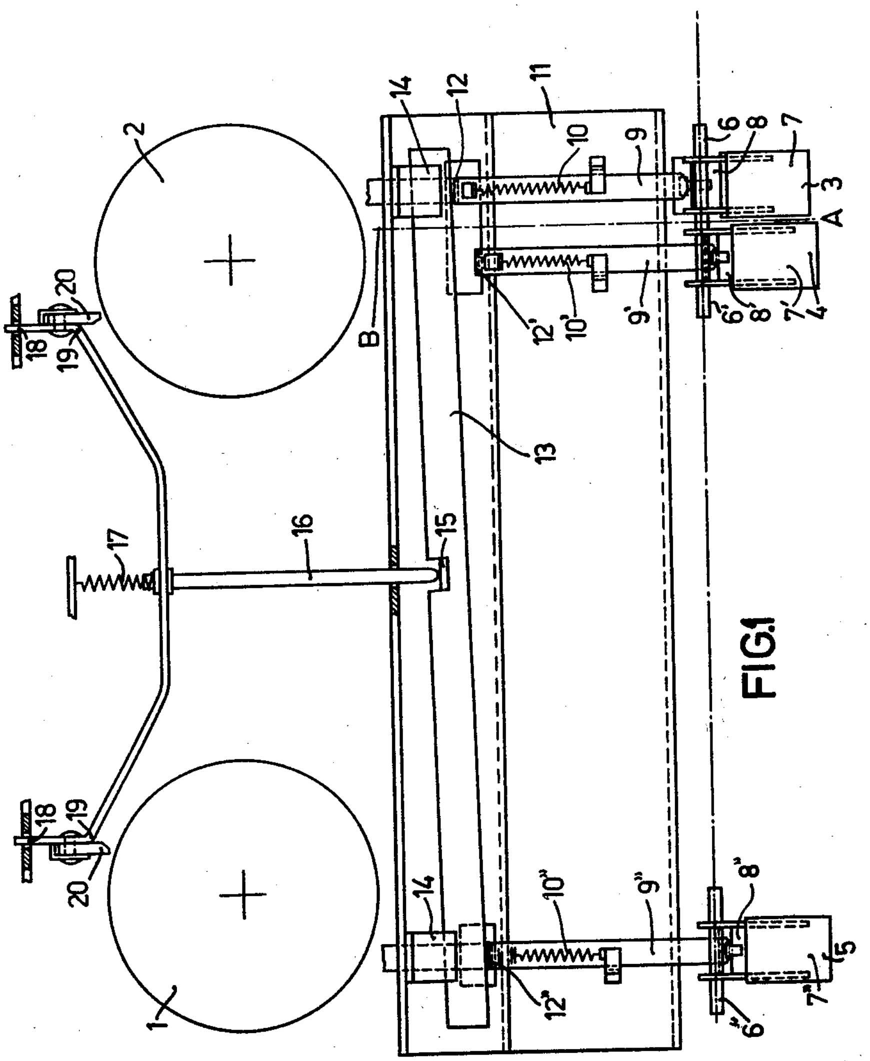
FIGURE 1 is a plan view of a device according to the invention for use in a tape recorder.

The device shown in FIGURES 1 and 2 comprises spools or tape holders 1 and 2. Since the spools have to perform three movements, namely a movement at normal speed for recording and reproducing, a fast forward movement and a fast return movement, provision is made of three separate switches 3, 4 and 5 for starting and stopping these movements. These switches are pivotal keys, connected with levers (8, 8′, 8″) which turn about pivots (6, 6′, 6″) to shift rods (9, 9′,9″) when keys (7, 7′, 7″), are depressed. The rods (9, 9′, 9″) are coupled to the keys by springs (10, 10′, 10″) which urge the rods downwardly as seen in FIGS. 1 and 2, and the rods are movably supported on a part 11 of the frame. The bearing of the pivots (6, 6′, 6″) and the mechanical means determining the two end-positions of the key are not shown in FIGURES 1 and 2. Neither is it shown in FIGURES 1 and 2 how, by depressing the keys, either through levers 8 or through rods 9, the switching position of the complete driving mechanism required for the selected movement is reached since any suitable known arrangement may be used such as hereinafter described in connection with FIGURES 3 to 6.

The rods 9 are bent as shown to provide supporting surfaces (12, 12′, 12″) which extend in a plane normal to the plane in which the rods move and are in alignment when the keys are all in the initial position. Rested on these supporting surfaces 12 is a lever 13, namely with one end on the supporting surfaces 12 and 12′ of the right-hand group of keys, and with its other end on the supporting surface 12″ of the separate left-hand key. This lever 13 is supported in a floating or rocking manner between the partial frame 11 and guide members 14. At the middle of the lever provision is made of a recess 15 into which the bar 16 is pressed by a spring 17 so that the ends of the lever 13 are held against the supporting surfaces 12 of the rods 9. The bar 16 is guided at several points at 18 so as to be movable only in a direction at right angles to the lever 13. Arms 19 of the rod, which extend to both sides, actuate brakes 20 which apply at the periphery of tape-holders 1 and 2 as long as the keys 3, 4 and 5 and consequently also the lever 13 are in the rest position.

When depressing one of the keys 3, 4, or 5 for a given movement of the record carrier or spools, the lever 13 turns about the end remote from the depressed key and the brakes 20 are released through bars 16, 19. On termination of the movement of the spools 1, 2, by causing the key to reassume its initial position the brakes are urged to applied position by spring 17.

In the drawing, the key 3 of the device has been depressed. Of course, it is insignificant which key is depressed for actuating the brake bars. The lever 13 coordinates the switches (keys 3, 4, 5) operating separately for switching on the movements and concentrates their effect, so far as regards the brakes, at a single location, namely the recess 15.

In the FIGURES 1 and 2 it is seen that the operation of the lever 13 is entirely independent of a particular construction of the switches 3, 4, 5 and associated members 6, 8, 9, 10 and 12. Thus, the position of lever 13, in brake release or brake on position, is determined each time an individual switch is operated. For the switches it is not absolutely necessary to use keys, since tumbler switches, other lever switches, rotary switches or the like may be used as well.

Linking of the lever 13 to the movable part of the switches, which determines the operative position of the lever, need not be effected by means of rods 9 and associated springs, since this may equally well be effected by articulated joints.

It may be desirable to be able to brake the spools for a short time without having to return the relative switch (key) to its rest position. In this case, it is advantageous to use switches or keys which are temporarily movable beyond their on-position. In the case of pivoted switches or keys (FIGURE 2) the levers or pawls 8 can easily be constructed in known manner (not shown) such that upon rotation beyond the on-position proper, the movement of the rod 9 occurs in a reverse manner so that the brakes again apply.

Figure 4:
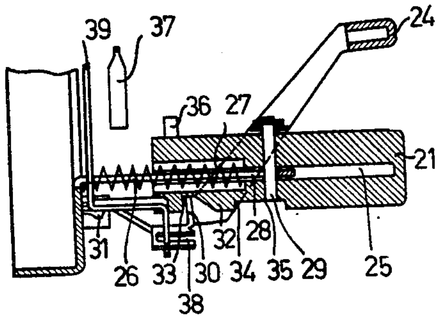
FIGURES 4 and 6 show push buttons of the construction shown in FIG. 3 in sectional view and, in particular, in their rest position (FIG. 4), in the normal working position (FIG. 6), and in FIG. 5 a modified push button is shown which may be pressed beyond its normal operating position for purposes hereinafter fully described.
Figure 5:
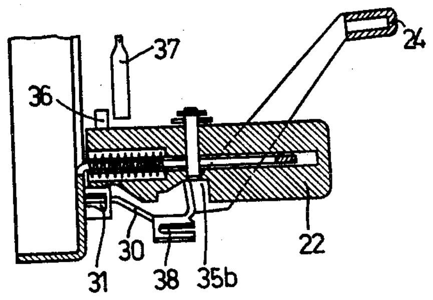
Figure 6:
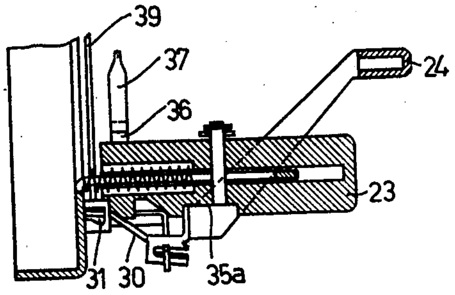

In a particularly simple device, the rod 9 and the lever 13 is directly coupled through a spring to a shaped surface, such as shown in FIGURES 4 to 6, which may be on levers (8, 8′, 8″) or cam permitting the floating lever to re-assume its initial position when moving the switch beyond its on-position.

Figure 3:
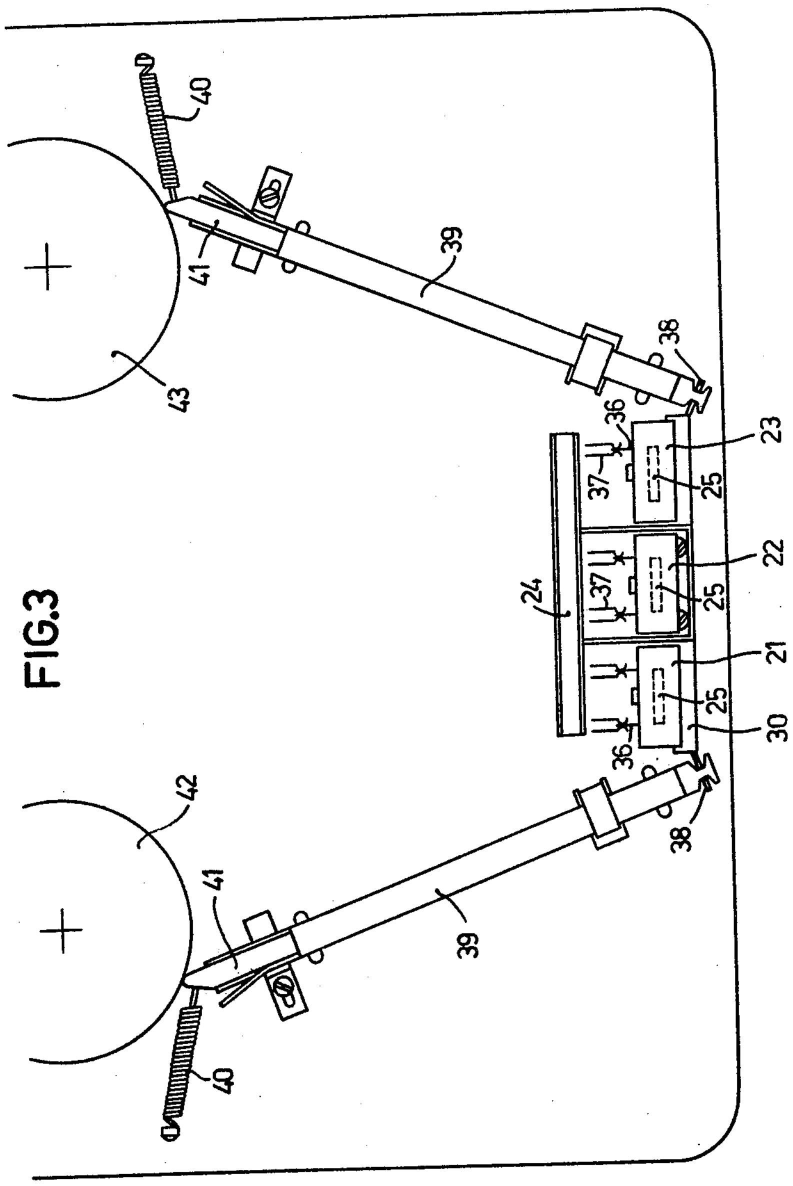
FIGURE 3 is a plan view of an arrangement, in which the switches or push buttons are united to form a switch board.

FIGS. 3, 4, and 6 represent a construction in which the individual switches, push buttons in this case, initiating each type of motion, are constructionally located to form a key aggregate or switch board. The three buttons for switching the types of operation are designated 21, 22 and 23. The button bodies of insulating material (best seen in FIGS. 4, 6) are provided with central recesses 25 permitting the bodies to be fitted to their supports 26 which serve to receive springs 27 urging the buttons outwardly. The button supports 26 are provided with a slot 28 for the passage of a pin 29 extending through the button body, by which pin and slot the outward movement of the button is limited. All the buttons are connected to a pawl 30 which is mounted for rotation about its longitudinal axis in bearings 31. One end of the pawl 30 engages a profiled or cam surface 32 constituted by a surface of the button bodies, and permitting the buttons to be locked in two different positions (33, 34) as a result of the cam shape. Moreover, the cam surface is shaped so that the button can be depressed beyond the on-position (seen in FIG. 6) to open contacts 36, 37 (as illustrated in FIG. 5). The off and on positions are respectively determined by shoulders 33, 34 in the cam surface of the buttons shown in FIGS. 4 and 6. The cam depths are so chosen that the pawl 30 in the off-position of the button (FIG. 4) and in its depressed or on-position (FIG. 6), have different rotational positions. In the on or depressed position of the button, the pawl is rotated to release the brakes by the button cam. The recess, *35a* FIG. 6, in which the pawl slides beyond the shoulder 34 on fully depressing the button may be such, according to the purpose aimed at, that the normal operational position of the pawl (FIG. 6) subsequently occupies the same operational position as occupied in the rest state, or brakes-on-position (FIG. 5, *35b*). Thus the arrangement of FIGS. 4 and 6 the button may be depressed beyond its normal operating position to open the contacts 36, 37 whereas the modified push button of FIG. 5 depressed beyond its normal operating position as shown opens the contacts 36, 37 and causes the brakes to be applied simultaneously. The modification of FIG. 5 is more fully described hereinafter.

The insulating button bodies contain knife-shaped electric contact pieces 36 by means of which electric contact pairs 37 are closed in the working position of the buttons, thus operating the electric control of the driving mechanism according to the type of operation chosen. The control mechanism is not shown in the drawing but its presence is indicated by a few contact pairs 37.

The pawl 30 carries at each of its ends a hook-shaped part 38 to which the pull-rods 39, constrained by springs 40, are connected. In this manner, the pawl 30 is permanently coupled to the contact or cam surface 32. Secured to the pull-rods 39 are brakes 41 acting on the two spools 42 and 43 as long as all the buttons are in the rest position. If one of the buttons is depressed, the pawl occupies its second conditional position so that the brakes are released. The brakes again apply when causing the button to resume its rest position, but the brakes may also be caused to apply by depressing a button having a cam path **35*b* beyond its working position, the degree of influencing the condition of the drive of the sound carrier or spools depending on the circumstances. Variation is possible by a corresponding construction of the contact members 36**.

It will be apparent to those skilled in the art that each button may have identical or dissimilar though suitable cam surfaces or pawl notches. In the drawing the cam surfaces are illustrated as depressions or recesses of greater or lesser depth (pawl notches) in the button body proper separated by the shoulder 34. As illustrated in FIG. 5 a composite pawl notch within which the pawl 30 resides, has a brake "off" surface adjacent the shoulder 34 and a brake applied surface **35*b* in order that the button 22 may be fully depressed to manually control operation by separating the contacts 36, 37** and applying the brakes.

FIG. 3 relates, for example, to a device in which the buttons 21 and 23 permit a fast backward movement and a fast forward movement of the sound-carrier by coupling the spools accordingly to the driving mechanism. The button 22 controls the rubber pressure roller (not shown) permitting the sound-carrier to be coupled to the driving shaft. If, consequently, the button 22 is depressed, the electric control for the rubber pressure roller is operated, since the contacts 36 and 37 become operative (FIG. 6) the sound-carrier advances at normal speed. Deep depression of the button 22 results in the contact between the contact pieces 36 and 37 being broken (FIG. 5) and consequently also the drive of the sound-carrier. Hence, the button 22 also has the function of a so-called "fast-stop control." In order to actually arrest the sound carrier momentarily, it is not sufficient only to interrupt its drive, since it has also to be braked momentarily. This is effected by the arrangement shown in FIGS. 3 and 5, since a deep depression causes the pawl 30 to occupy the same operaional position as in the initial position of the key, so that the brakes apply immediately.

The pawl 30 may also have connected to it a release member of its own, in the present case the lever 24. Apart from switching the buttons to neutral, lever 24 also permits release of the brakes without the sound-carrier being actuated by the driving mechanism of the apparatus.

Since the brakes are released, the sound carrier is easily slightly movable by hand.

The invention is not limited to magnetic recorders using a tape or wire sound-carrier, since it also applies to devices in which a disk-shaped sound-carrier rests on a turntable.

What is claimed is:

1. A brake operating mechanism for recording/reproducing apparatus having a brake means movable between a brake applied position and a brake released position comprising,
a rotatable pawl having a plurality of spaced projections,
means for rotatably mounting said pawl,
means operatively connecting said pawl and said brake means,
a plurality of control members for selectively controlling said apparatus,
each said control member having at least a first and a second pawl notch of unequal depth for successively receiving an associated pawl projection upon movement of the associated control member in one direction and preventing movement of said control member in the reverse direction whereby movement of any one of said control members rotates said pawl for moving said brake means from one of said positions to the other of said positions,
and a resealse member connected with said pawl for independently controlling movement thereof.

2. A brake operating mechanism for recording/reproducing apparatus havnig a brake means movable between a brake applied position and a brake released position comprising,
a rotatable pawl having a plurality of spaced projections,
means for rotatably mounting said pawl,
means operatively connecting said pawl and said brake means.

a plurality of control members for selectively controlling said apparatus,
each said control member having at least a first and a second pawl notch of unequal depth for successively receiving an associated pawl projection upon movement of the associated control member in one direction and preventing movement of said control member in the reverse direction whereby movement of any one of said control members rotates said pawl for moving said brake means from one of said positions to the other of said positions.

3. A brake operating mechanism according to claim 2 wherein at least one of said control members has a first pawl notch and a second composite pawl notch, said one control member being movable in said reverse direction when said pawl projection is received in said composite pawl notch whereby said pawl is rotated in two directions for releasing and applying said brakes upon movement of said one control member in one direction and in a reverse direction.

4. A brake operating mechanism according to claim 3 wherein each of said control members comprises a push button having said pawl notches integral therewith and spaced in the longitudinal direction of said push button,
said means operatively connecting said pawl and said brake means comprises a bifurcated part carried by said pawl at at least one end thereof,
and a pull rod connecting said brake means and said bifurcated part.

References Cited in the file of this patent

UNITED STATES PATENTS

| | | |
|---|---|---|
| 2,625,337 | Williams | Jan. 13, 1953 |
| 2,782,263 | Hoehn | Feb. 19, 1957 |
| 2,859,636 | Hironimus | Nov. 11, 1958 |

FOREIGN PATENTS

| | | |
|---|---|---|
| 331,619 | Great Britain | July 10, 1930 |